US010330557B2

(12) United States Patent
Son (10) Patent No.: US 10,330,557 B2
(45) Date of Patent: Jun. 25, 2019

(54) DEVICE AND METHOD FOR TESTING AIRTIGHTNESS OF FUEL CELL STACK (71) Applicant: HYUNDAI MOTOR COMPANY, Seoul (KR)

(72) Inventor: Ji Hwan Son, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 372 days.

(21) Appl. No.: 15/372,061

(22) Filed: Dec. 7, 2016

(65) Prior Publication Data

US 2018/0067013 A1 Mar. 8, 2018

(30) Foreign Application Priority Data

Sep. 8, 2016 (KR) ........................ 10-2016-0115743

(51) Int. Cl.
*G01M 3/20* (2006.01)
*H01M 8/04664* (2016.01)
(Continued)

(52) U.S. Cl.
CPC ........... *G01M 3/20* (2013.01); *H01M 8/0444* (2013.01); *H01M 8/04664* (2013.01);
(Continued)

(58) Field of Classification Search
CPC ............... G01M 3/20; H01M 8/04664; H01M 8/04671; H01M 8/04679; H01M 8/04686
See application file for complete search history.

(56) References Cited

U.S. PATENT DOCUMENTS 7,383,720 B2 * 6/2008 Buerkle .................. G01M 3/20
73/159
2007/0292726 A1 * 12/2007 Iida .................... H01M 8/04089
429/444
(Continued)

FOREIGN PATENT DOCUMENTS

JP 11-260389 A 9/1999
JP 2011-179975 A 9/2011
(Continued)

OTHER PUBLICATIONS

Notice of Allowance issued in Korean Patent Application No. 10-2016-0115743 dated Nov. 30, 2018.

*Primary Examiner* — Son T Le
*Assistant Examiner* — Herbert K Roberts
(74) *Attorney, Agent, or Firm* — Morgan Lewis & Bockius LLP (57) ABSTRACT Disclosed is a device for testing airtightness of a fuel cell stack. The device for testing airtightness of a fuel cell stack including a first reaction gas inflow portion and a first reaction gas outflow portion which a first reaction gas flows in or out, respectively, and a second reaction gas inflow portion and a second reaction gas outflow portion which a second reaction gas flows in and out, respectively, includes i) a detection gas supplier supplying a detection gas to the first reaction gas inflow portion, ii) an intake installed to be movable in a sequential stacking direction of fuel cells in the second reaction gas outflow portion, iii) a detection gas concentration detector intaking a detection gas through the intake and detecting a concentration of the detection gas, and iv) a controller determining an airtightness-defective cell based on a position of the intake by analyzing the detected concentration value of the detection gas detected by the detection gas concentration detector.

16 Claims, 8 Drawing Sheets

(51) Int. Cl.
H01M 8/2465 (2016.01)
H01M 8/0444 (2016.01)

(52) U.S. Cl.
CPC ... *H01M 8/04671* (2013.01); *H01M 8/04679* (2013.01); *H01M 8/04686* (2013.01); *H01M 8/2465* (2013.01)

(56) References Cited

U.S. PATENT DOCUMENTS

| | | | | |
|---|---|---|---|---|
| 2010/0112395 A1* | 5/2010 | Ogawa | ............. | H01M 8/04007 |
| | | | | 429/465 |
| 2011/0081587 A1* | 4/2011 | Park | .................. | H01M 8/0438 |
| | | | | 429/428 |
| 2011/0262823 A1* | 10/2011 | Seitz | ...................... | G01M 3/22 |
| | | | | 429/443 |
| 2015/0226629 A1 | 8/2015 | Murthy | | |
| 2015/0357661 A1* | 12/2015 | Chaudron | ......... | H01M 8/04902 |
| | | | | 429/446 |

FOREIGN PATENT DOCUMENTS

| | | |
|---|---|---|
| JP | 2016-042413 A | 3/2016 |
| KR | 10-2009-0062111 A | 6/2009 |
| KR | 10-0911589 B1 | 8/2009 |
| WO | 2014/038192 A1 | 3/2014 |

* cited by examiner

DEVICE AND METHOD FOR TESTING AIRTIGHTNESS OF FUEL CELL STACK

CROSS-REFERENCE TO RELATED APPLICATION

This application claims the benefit of priority to Korean Patent Application No. 10-2016-0115743, filed in the Korean Intellectual Property Office on Sep. 8, 2016, the entire content of which is incorporated herein by reference.

TECHNICAL FIELD

An exemplary embodiment of the present disclosure relates to a device and method for testing airtightness of a fuel cell stack and, more particularly, to a device and method for testing airtightness of a fuel cell stack capable of accurately detecting an airtightness-defective cell among fuel cells.

BACKGROUND

A fuel cell stack is an electricity-generating device producing electrical energy through an electrochemical reaction between hydrogen and oxygen by fuel cells, and may be applied to fuel cell vehicles, for example.

A fuel cell stack may be configured as an electricity-generating assembly in which hundreds of units of fuel cells are successively arranged. The fuel cells each have a configuration in which separators are disposed on opposing sides with a membrane-electrode assembly interposed therebetween. Fuel cells, in a state of being pressed at a predetermined pressure, are fastened through an end plate and a fastening unit.

The MEA includes an electrolyte membrane and a cathode catalytic layer and an anode catalytic layer formed on opposing sides of the electrolyte membrane. A gas diffusion layer (GDL), a gasket, and the like, are stacked on the catalytic layers. The separators each have a flow channel allowing a reaction gas of hydrogen and air to flow to the anode catalytic layer and the cathode catalytic layer.

In the fuel cell stack, since hundreds of units of fuel cells are stacked and pressed, airtightness of the fuel cells may be defective due to various reasons. An airtightness-defective cell causes a reaction gas to flow out to degrade efficiency and performance of the fuel cell stack and causes a safety problem. Thus, testing an airtightness defect of fuel cells is essential in a process of assembling a fuel cell stack.

In the related art, airtightness testing is performed in a state in which a fuel cell stack is completely assembled. Thus, when an airtightness defect occurs, the fuel cell stack is disassembled, fuel cells are separated and airtightness testing is performed thereon to locate an airtightness-defective cell.

Thus, the related art requires a great deal of time to test airtightness of a fuel cell stack, the overall testing process is complicated, and normal cells may be damaged in the process of disassembling the fuel cell stack and separating the fuel cells.

Matters described in the background art section are provided to promote understanding of the background of the present disclosure, and may include matter that is not prior art known to those skilled in the art to which the present disclosure pertains.

SUMMARY

The present disclosure has been made in an effort to provide a device and method for testing airtightness of a fuel cell stack, having advantages of accurately detecting an airtightness-defective cell among fuel cells without disassembling a fuel cell stack.

An exemplary embodiment of the present disclosure provides a device for testing airtightness of a fuel cell stack including a first reaction gas inflow portion and a first reaction gas outflow portion through which a first reaction gas flows in and out, respectively, and a second reaction gas inflow portion and a second reaction gas outflow portion through which a second reaction gas flows in and out, respectively, including: a detection gas supplier supplying a detection gas to the first reaction gas inflow portion; an intake installed to be movable in a sequential stacking direction of fuel cells in the second reaction gas outflow portion; a detection gas concentration detector intaking the detection gas through the intake and detecting a concentration of the detection gas; and a controller determining an airtightness-defective cell based on a position of the intake by analyzing the detected concentration value of the detection gas detected by the detection gas concentration detector.

The device may further include: a jig closing the first reaction gas inflow portion, opening the second reaction gas inflow portion, and closing the first and second reaction gas outflow portions.

The intake may intake air introduced to the second reaction gas outflow portion through the second reaction gas inflow portion and a detection gas leaked to the second reaction gas outflow portion through the first reaction gas outflow portion.

The intake may intake a background source of the second reaction gas outflow portion, establish a detection background in the second reaction gas outflow portion, and intake a detection source of the second reaction gas outflow portion.

The intake may include: a background pipe intaking the background source; and a detection pipe intaking the detection source.

The intake may be provided as a dual-pipe in which the background pipe is disposed on the inner side of the detection pipe and integrally connected with the detection pipe.

Another exemplary embodiment of the present disclosure provides a device for testing airtightness of a fuel cell stack in which fuel cells are successively stacked, including: a first jig closing a first reaction gas inflow portion of the fuel cell stack and opening a second reaction gas inflow portion; a detection gas supplier connected to the first jig and supplying a detection gas to the first reaction gas inflow portion; a second jig closing first and second reaction gas outflow portions of the fuel cell stack; an intake mounted in the second jig and installed to be movable in a sequential stacking direction of the fuel cells within the second reaction gas outflow portion; a detection gas concentration detector installed to be connected to the intake, intaking a detection source on an inner side of the second reaction gas outflow portion through the intake, and detecting a concentration of the detection gas; and a controller determining an airtightness-defective cell based on a position of the intake by analyzing the detected concentration value of the detection gas detected by the detection gas concentration detector.

The detection gas supplier may include: a gas tank storing a gas lighter than air as the detection gas; and a supply hose connecting the gas tank and the first reaction gas inflow portion.

The intake may include: a background pipe intaking a background source of the second reaction gas outflow portion; and a detection pipe connected to the background pipe provided on an inner side thereof and intaking a detection source of the second reaction gas outflow portion through a portion between the detection pipe and the background pipe.

The second reaction gas outflow portion and the background pipe may be connected to an exhaust pump.

The detection pipe may be connected to the detection gas concentration detector.

A detection gas intake passage may be provided between an outer circumferential surface of the background pipe and an inner circumferential surface of the detection pipe.

The background pipe may have a flange supporting an inner wall of the second reaction gas outflow portion.

The detection pipe may be disposed to be spaced apart from the flange, and a detection source inlet passage may be provided between the detection pipe and the flange.

The device may further include: a driver installed in the second jig and linearly moving the intake by a rotational force from a servo motor.

Yet another exemplary embodiment of the present disclosure provides a method for testing airtightness of a fuel cell stack, including steps of: closing a first reaction gas inflow portion, opening a second reaction inflow portion, closing first and second reaction gas outflow portions, setting an intake in the second reaction gas outflow portion, and supplying a detection gas to the first reaction gas inflow portion; intaking a background source of the second reaction gas outflow portion through the intake and establishing a detection background; intaking a detection source of the second reaction gas outflow portion through the intake, and moving the intake in a sequential stacking direction of fuel cells through a servo motor; and detecting a concentration of the detection gas through a detection gas concentration detector and analyzing the detected concentration value to determine an airtightness-defective cell based on a position of the intake.

The intake may be in the form of a dual-pipe in which a background pipe intaking a background source may be provided on an inner side of a detection pipe intaking a detection source.

Cell numbers of fuel cells may be obtained with respect to a movement position of the intake based on an revolution per minute (RPM) of the servo motor.

A section in which the detected concentration value of the detection gas of the detection source detected by the detection gas concentration detector is uniform within a set range is set as a reference concentration.

It may be determined whether the detected concentration value of the detection gas exceeds the reference concentration.

When it is determined that the detected concentration value of the detection gas exceeds the reference concentration, the cell number of a fuel cell based on a movement position of the intake may be indicated, and the fuel cell corresponding to the cell number may be determined as an airtightness-defective cell.

According to the exemplary embodiments of the present disclosure, since an airtightness-defective cell is accurately located from among fuel cells, without assembling the fuel cell stack, a time required for testing airtightness of the fuel cell stack may be shortened and convenience of the testing process may be promoted.

In addition, in the exemplary embodiment of the present disclosure, since the detection source including a minimum amount of detection gas is intaken and a concentration of the detection gas of the detection source is detected in a state in which a detection background is established in the second reaction gas outflow portion through the intake, detection accuracy and detection regeneration capability of the detection gas concentration detector may be enhanced and performance of detecting an airtightness-defective cell may be further enhanced.

BRIEF DESCRIPTION OF THE DRAWINGS

The drawings are used to be referred to in describing exemplary embodiments of the present disclosure, so a technical concept of the present disclosure should not be meant to restrict the disclosure to the accompanying drawings.

DETAILED DESCRIPTION OF THE EMBODIMENTS

Hereinafter, the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

In the drawings, sizes and thickness of components are arbitrarily shown for the description purposes, so the present disclosure is not limited to the illustrations of the drawings and thicknesses are exaggerated to clearly express various parts and regions.

In the following descriptions, terms such as "first" and "second," etc., may be used only to distinguish one component from another as pertinent components are named the same, and order thereof is not limited.

Throughout the specification, unless explicitly described to the contrary, the word "comprise" and variations such as "comprises" or "comprising", will be understood to imply the inclusion of stated elements but not the exclusion of any other elements.

The terms "unit", "means", "part", "member", and the like, described in the specification refer to units of comprehensive configuration performing at least one function or operation.

Figure 1:
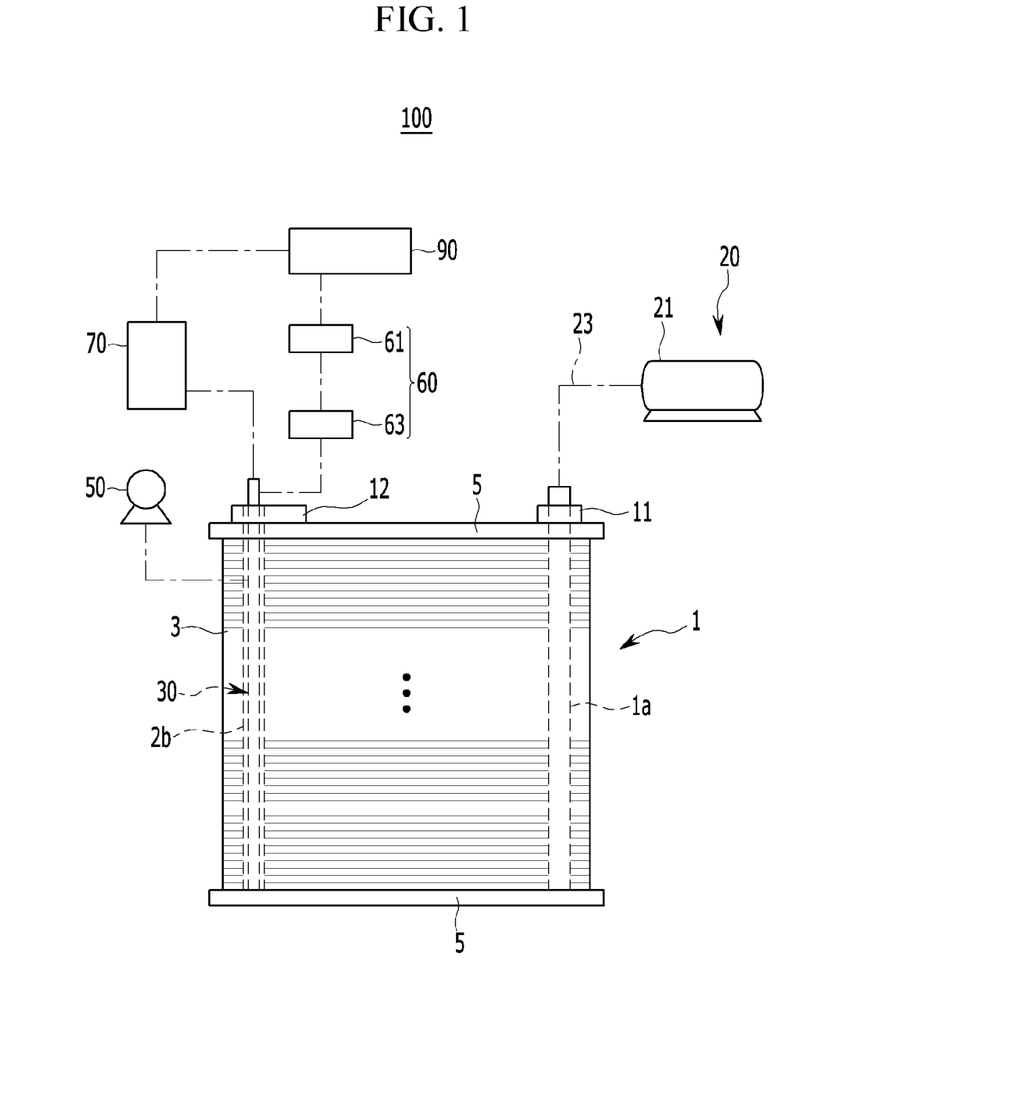
FIG. 1 is a block diagram schematically illustrating a device for testing airtightness of a fuel cell stack according to an exemplary embodiment of the present disclosure.

FIG. 1 is a block diagram schematically illustrating a device for testing airtightness of a fuel cell stack according to an exemplary embodiment of the present disclosure.

Referring to FIG. 1, a device 100 for testing airtightness of a fuel cell stack according to an exemplary embodiment of the present disclosure may be applied to an airtightness testing process of testing airtightness of a fuel cell stack 1 assembled during a stack assembly process.

Here, during the stack assembly process, a plurality of fuel cells 3 are sequentially stacked, pressed, and fastened through end plates 5 to assemble the fuel cell stack 1.

Hereinafter, components of the airtightness testing device 100 according to an exemplary embodiment of the present disclosure will be described with respect to the fuel cells 3 stacked in a vertical direction. Thus, a portion facing upwards may be defined as an upper portion and an upper end, and a portion facing downwards may be defined as a lower portion and a lower end.

However, the definition of directions is relative and directions may be varied according to a stacking direction of the fuel cells 3, a reference position of the airtightness testing device 100, and the like, and thus, the aforementioned reference direction is not limited to the reference direction of the present embodiment.

Figure 2:
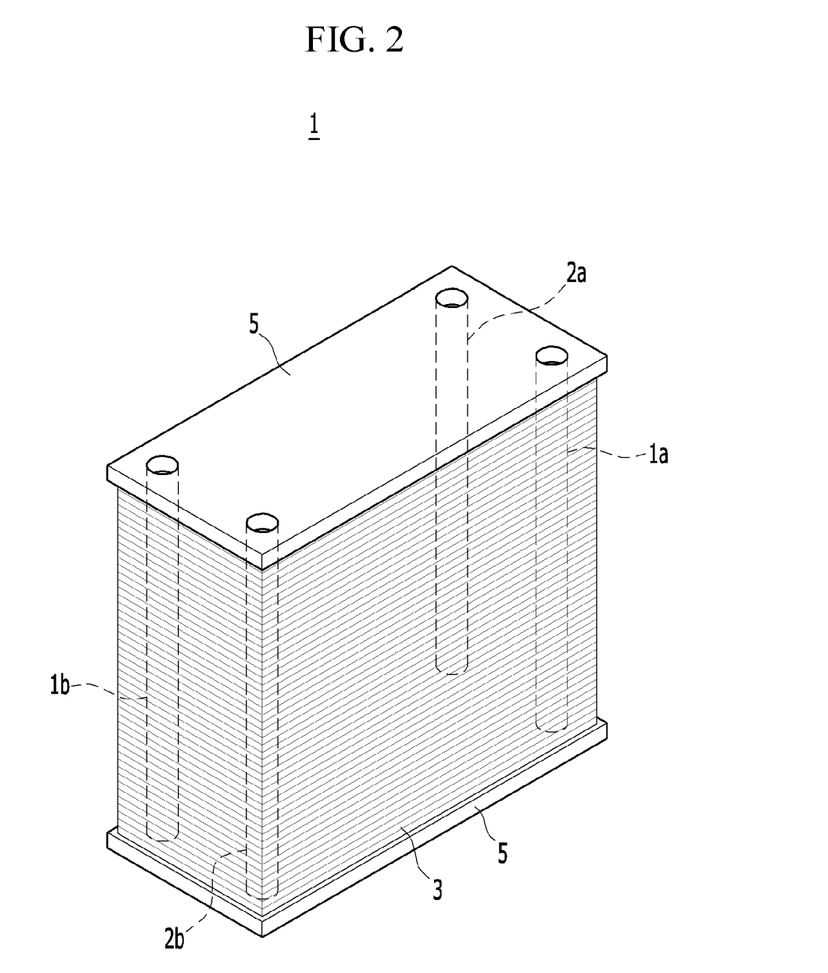
FIG. 2 is a perspective view schematically illustrating a fuel cell stack applied to an exemplary embodiment of the present disclosure.

As illustrated in FIG. 2, the fuel cell stack 1 applied to an exemplary embodiment of the present disclosure includes a first reaction gas inflow portion 1*a*, a first reaction gas outflow portion 1*b*, a second reaction gas inflow portion 2*a*, and a second reaction gas outflow portion 2*b*, as a manifold for supplying and discharging a reaction gas (hydrogen, air).

For example, the first reaction gas inflow portion 1*a* and the second reaction gas inflow portion 2*a* are formed to extend downwardly from one side of an upper end plate 5 to a lower end plate 5 with respect to a vertical stacking direction of the fuel cells 3. The first reaction gas outflow portion 1*b* and the second reaction gas outflow portion 2*b* are formed to extend downwardly from another side of the upper end plate 5 to the lower end plate 5.

The first reaction gas inflow portion 1*a* and the first reaction gas outflow portion 1*b* are connected through flow channels provided in separators (not shown) of the fuel cells 3, and the second reaction gas inflow portion 2*a* and the second reaction gas outflow portion 2*b* are also connected through flow channels provided in the separators.

Here, the first and second reaction gases refer to hydrogen and air required for an electrochemical reaction of the fuel cells 3. When the first reaction gas is hydrogen, the second reaction gas is air, and when the first reaction gas is air, the second reaction gas is hydrogen.

The device 100 for testing airtightness of a fuel cell stack according to an exemplary embodiment of the present disclosure has a structure capable of accurately detecting an airtightness-defective cell among the fuel cells 3 without disassembling the fuel cell stack 1, unlike the related art.

In addition, the exemplary embodiment of the present disclosure provides the device 100 for testing airtightness of a fuel cell stack capable of shortening time required for testing airtightness of the fuel cell stack 1 and promoting convenience of a testing process.

Referring to FIGS. 1 and 2, the device 100 for testing airtightness of a fuel cell stack according to the present exemplary includes jigs 11 and 12, a detection gas supplier 20, an intake 30, a detection gas concentration detector 70, and a controller 90.

Various components of the airtightness testing device 100 described hereinafter are installed in a frame (not shown), and the frame, which supports each of the components, may be configured as a single frame or two or more divided frames. The frame may include various accessory elements such as a bracket, a bar, a rod, a plate, a housing, a case, a block, and the like, to support various components.

In an exemplary embodiment of the present disclosure, the jigs 11 and 12, serving to install the detection gas supplier 20 and the intake 30 described hereinafter, are installed in the fuel cell stack 1. The jigs 11 and 12 close the first reaction gas inflow portion 1*a* of the fuel cell stack 1, open the second reaction gas inflow portion 2*a*, and close the first and second reaction gas outflow portions 1*b* and 2*b*.

The jigs 11 and 12 may be provided as a single airtight jig main body, or may be provided as separate airtight jig main bodies. However, in an exemplary embodiment of the present disclosure, the jigs 11 and 12 are provided as separate airtight jig main bodies, for example, and hereinafter, the separately divided jigs 11 and 12 will be referred to as a first jig 11 and a second jig 12.

The first jig 11 is connected with the detection gas supplier 20 (to be described hereinafter). The first jig 11 is mounted in an upper portion of the fuel cell stack 1 and closes the first reaction gas inflow portion 1*a* and opens the second reaction gas inflow portion 2*a*.

The second jig 12 is connected with the intake 30 (to be described hereinafter). The second jig 12 is mounted in an upper portion of the fuel cell stack 1 and closes the second reaction gas outflow portions 1*b* and 2*b*.

In an exemplary embodiment of the present disclosure, the detection gas supplier 20 serves to supply a helium gas, as a detection gas, lighter than air to the first reaction gas inflow portion 1 of the fuel cell stack 1

The detection gas supplier 20 is provided to be connected to the first jig 11 and includes a gas tank 21 storing a helium gas and a supply hose 23 connecting the gas tank 21 and the first reaction gas inflow portion 1*a*.

Here, in a state in which the first reaction gas inflow portion 1*a* is closed by the first jig 11 and the first and second reaction gas outflow portions 1*b* and 2*b* are closed by the second jig 1, when a detection gas is supplied to the first reaction gas inflow portion 1*a* through the detection gas supplier 20, the detection gas may be introduced to (or may flow to) the first reaction gas outflow portion 1*b* through separators of the fuel cells 3.

When an airtightness-defective cell is present among the fuel cells 3, the detection gas introduced to the first reaction gas outflow portion 1*b* may be introduced to the second reaction gas outflow portion 2*b* through a leak portion of the airtightness-defective cell.

Since the second reaction gas inflow portion 2*a* is opened through the first jig 11, when a pumping pressure is applied to the second reaction gas outflow portion 2*b* through a predetermined pumping unit (an exhaust pump and an intaking pump of the detection gas concentration detector as described hereinafter), air may be introduced to the second reaction gas outflow portion 2*b* through the second reaction gas inflow portion 2*a* and the separators of the fuel cells 3.

Figure 3:
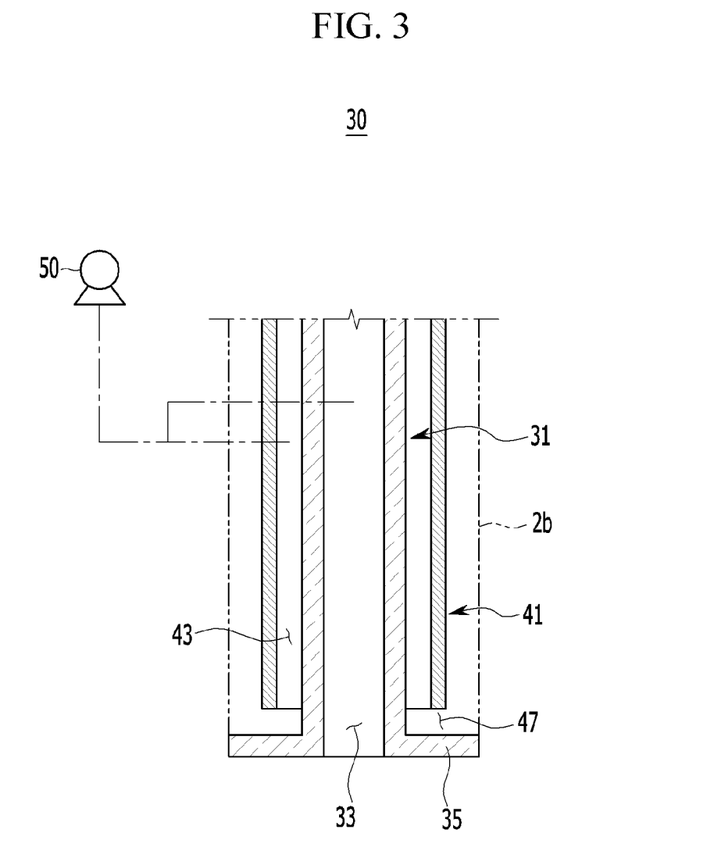
FIGS. 3 and 4 are views schematically illustrating an intake applied to a device for testing airtightness of a fuel cell stack according to an exemplary embodiment of the present disclosure.
Figure 4:
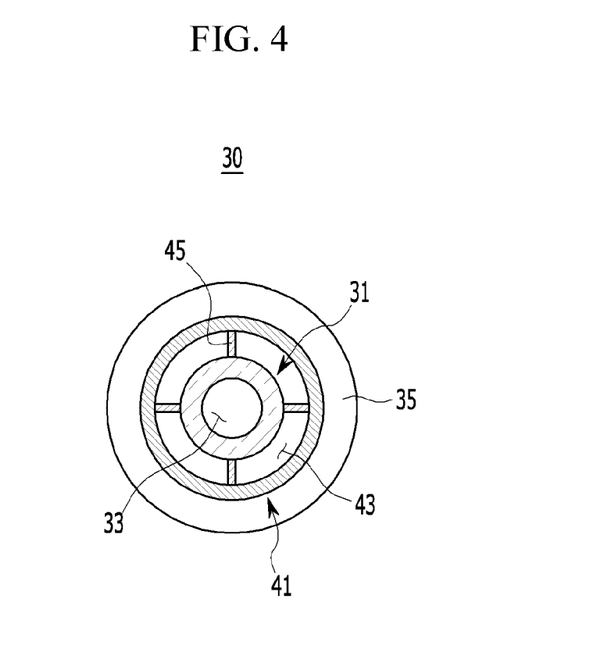

FIGS. 3 and 4 are views schematically illustrating an intake applied to a device for testing airtightness of a fuel cell stack according to an exemplary embodiment of the present disclosure.

Referring to FIGS. 3 and 4, in an exemplary embodiment of the present disclosure, the intake 30 serves to intake air introduced to the second reaction gas outflow portion 2*b* through the second reaction gas inflow portion 2*a* and a detection gas leaked to the second reaction gas outflow portion 2*b* through the first reaction gas outflow portion 1*b*.

That is, the intake 30 may intake a background source of the second reaction gas outflow portion 2*b* through the aforementioned pumping unit and establish a detection background in the second reaction gas outflow portion 2*b*. Also, with the detection background established in the second reaction gas outflow portion 2b, the intake 30 may intake a substantial detection source of the second reaction gas outflow portion 2b.

Here, the background source refers to air introduced to the second reaction gas outflow portion 2b and a detection gas (leak gas), and the detection background refers to exhausting a detection background source from the second reaction gas outflow portion 2b to the outside in order to enhance detection accuracy and detection regeneration capability of the detection gas concentration detector 70 (to be described hereinafter).

The detection source refers to air and a detection gas (leak gas) introduced to the second reaction gas outflow portion 2b in a state in which the detection background is established in the second reaction gas outflow portion 2b. Such a detection source is sucked to the detection gas concentration and may provide a minimum amount of detection gas to the detection gas concentration detector 70 sensitive to a flow rate of a detection gas.

The intake 30 is mounted in the second jig 12 and installed to be movable in a sequential stacking direction (vertical direction) of the fuel cells 3 within the second reaction gas outflow portion 2b. The intake 30 includes a background pipe 31 and a detection pipe 41.

The background pipe 31, intaking a background source of the second reaction gas outflow portion 2b, has a background source intake passage 33 as a hollow. The background pipe 31 is disposed in a vertical stacking direction of the fuel cells 3 in the second reaction gas outflow portion 2b, and disposed such that a lower end thereof is in contact with the lower end plate 5, as an initial position.

A flange 35 is formed in a lower end portion of the background pipe 31. The flange 35 supports the lower end plate 5 and an inner wall of the second reaction gas outflow portion 2b.

The detection pipe 41, intaking a detection source of the second reaction gas outflow portion 2b, has a hollow and is connected to the background pipe 31 present on an inner side of the hollow.

That is, the intake 30 according to an exemplary embodiment of the present invention is provided as a dual-pipe in which the background pipe 31 is disposed on an inner side of the detection pipe 41 and integrally connected with the detection pipe 41.

The detection pipe 41 may be disposed in a vertical stacking direction of the fuel cells 3 in the second reaction gas outflow portion 2b, and intake a detection source of the second reaction gas outflow portion 2b through a portion between the detection pipe 41 and the background pipe 31. Thus, a detection source intake passage 43 is formed between an outer circumferential surface of the background pipe 31 and an inner circumferential surface of the detection pipe 41.

Here, the outer circumferential surface of the background pipe 31 and the inner circumferential surface of the detection pipe 41 may be integrally connected through a partition 45. Thus, the detection source intake passage 43 at an interval set by the partition 45 between the outer circumferential surface of the background pipe 31 and the inner circumferential surface of the detection pipe 41.

The detection pipe 41 is disposed to be spaced apart from the flange 35 of the background pipe 31, and a detection source inlet passage 47 is formed between a lower end of the detection pipe 41 and the flange 35 to allow a detection source to be introduced to the detection source intake passage 43.

In an exemplary embodiment of the present disclosure, as illustrated in FIGS. 1 and 3, an exhaust pump 50 is provided to intake a background source of the second reaction gas outflow portion 2b and discharge the intaken background source outwardly.

The exhaust pump 50 is connected to the second reaction gas outflow portion 2b and the background source intake passage 33 of the background pipe 31. The exhaust pump 50 may be connected to an outer space of the detection pipe 41 and connected to the background source intake passage 33 of the background pipe 31 in the second reaction gas outflow portion 2b, and intake a background source of the second reaction gas outflow portion 2b.

The detection pipe 41 is connected to the detection gas concentration detector 70 (to be further described hereinafter), and intakes a detection source through the detection source intake passage 43 by a pumping pressure of the detection gas concentration detector 70.

In an exemplary embodiment of the present disclosure, as illustrated in FIG. 1, a driver 60 moves the intake 30 in a sequential stacking direction (upward direction) of the fuel cells 3 from an initial position of the background pipe 31.

The driver 60 is connected to the intake 30 and installed in the jig 12. The driver 60 includes a servo motor 61 and may be able to move the intake 30 in the sequential stacking direction of the fuel cells 3 by a rotational force of the servo motor 61.

The driver 60 may move the intake 30 in the sequential stacking direction of the fuel cells 3 through a guide structure 63 of a known art having a lead (or ball) screw and a guide rail converting a rotational force of the servo motor 61 into a linear movement.

Referring to FIGS. 3 and 4 together with FIG. 1, in an exemplary embodiment of the present disclosure, the detection gas concentration detector 70 intakes a detection source of the second reaction gas outflow portion 2b through the detection pipe 41 of the intake 30 and detects a concentration of the detection gas included in the detection source. The detection gas concentration detector 70 detects a concentration of a helium gas and outputs a detection value to the controller 90.

The detection gas concentration detector 70 is installed to be connected to the detection pipe 41 of the intake 30. The detection gas concentration detector 70 includes an intake pump (not shown) for intaking a detection source of the second reaction gas outflow portion 2b through the detection pipe 41. That is, the detection gas concentration detector 70 may intake the detection source of the second reaction gas outflow portion 2b through the detection source intake passage 43 of the intake 30 by a pumping pressure of the intake pump.

Referring to FIG. 1, in an exemplary embodiment of the present disclosure, the controller 90 controls an overall operation of the airtightness testing device 100. The controller 90 may be implemented as one or more microprocessors (control logic) operated by a program.

The controller 90 may apply a control signal to the detection gas supplier 20, the exhaust pump 50, the servo motor 61, and the detection gas concentration detector 70 as mentioned above, and control operations thereof.

Also, the controller 90 may determine an airtightness-defective cell according to a position of the intake 30 by analyzing a concentration detection value of a detection gas detected by the detection gas concentration detector 70. Control logic of the controller 90 for determining an airtightness-defective cell will be described in detail in a method for testing airtightness of a fuel cell stack hereinafter.

Hereinafter, a method for testing airtightness of a fuel cell stack using the device 100 for testing airtightness of a fuel cell stack according to an exemplary embodiment of the present disclosure configured as described above will be described in detail with reference to the accompanying drawings.

Figure 5:
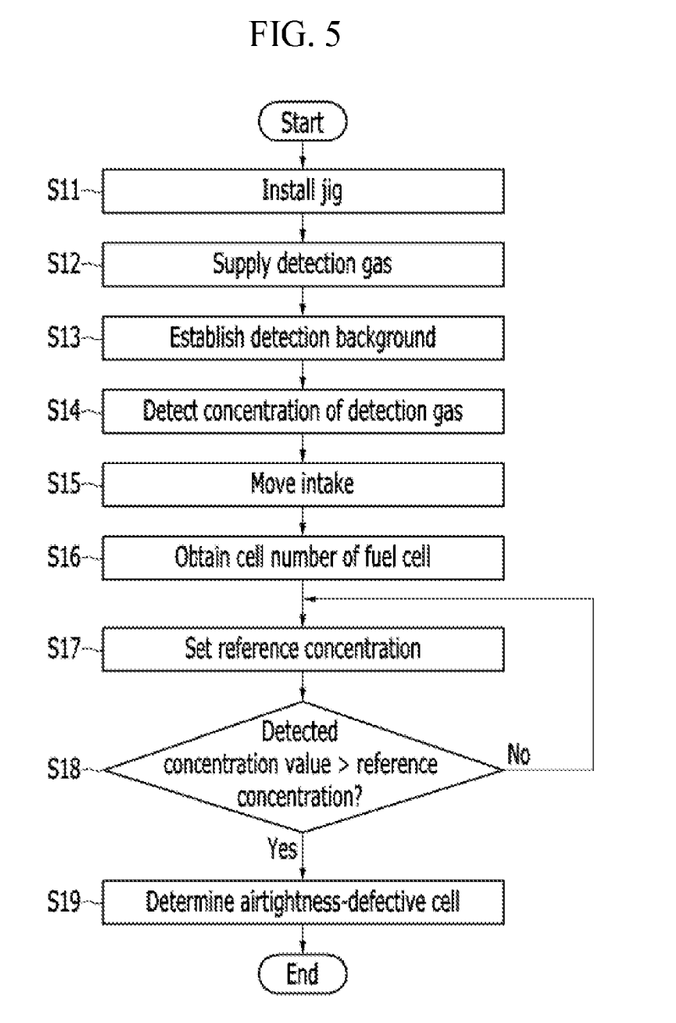
FIG. 5 is a flow chart illustrating a method for testing airtightness of a fuel cell stack according to an exemplary embodiment of the present disclosure.
Figure 6:
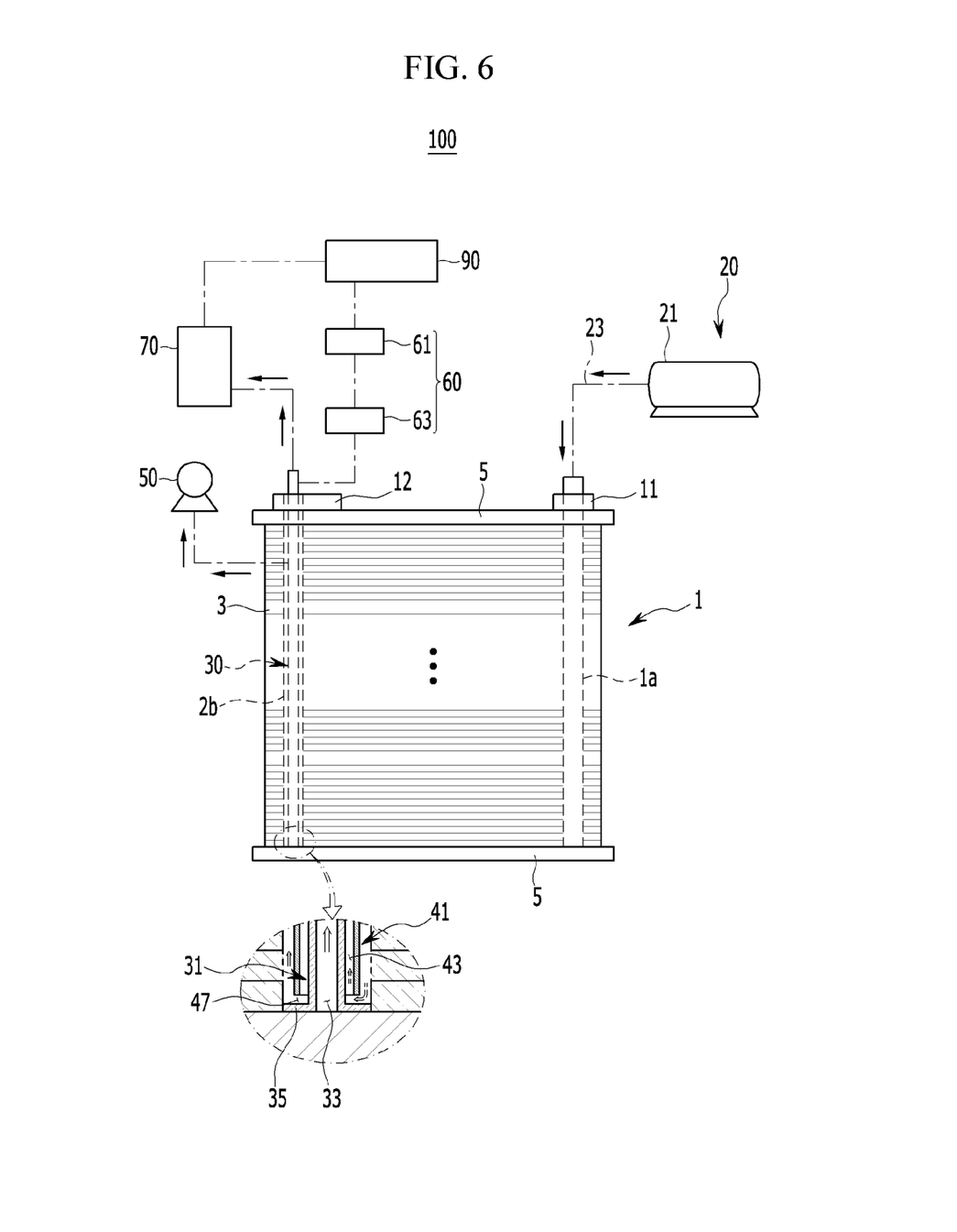
FIGS. 6 to 8 are view illustrating operational states of a device for testing airtightness of a fuel cell stack to describe a method for testing airtightness of a fuel cell stack according to an exemplary embodiment of the present disclosure.
Figure 7:
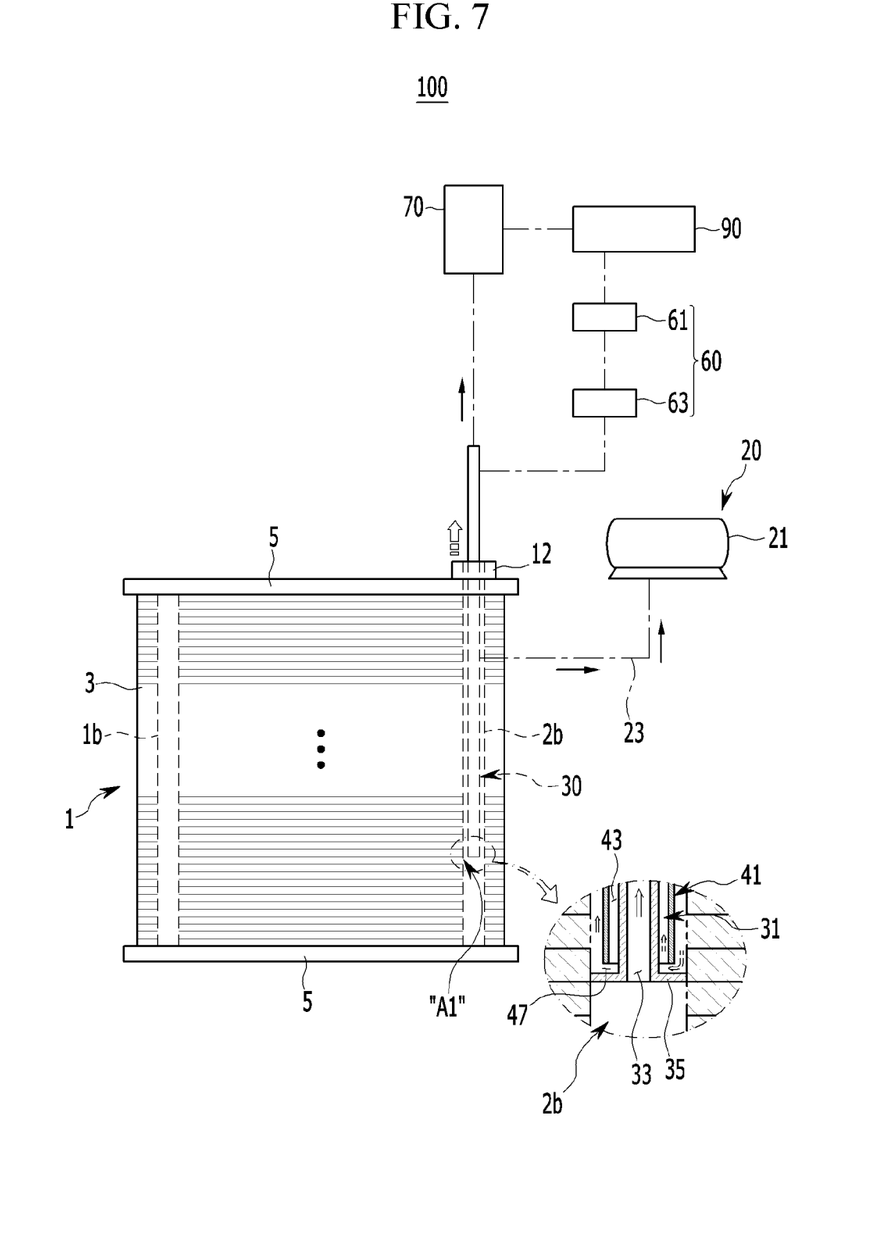
Figure 8:
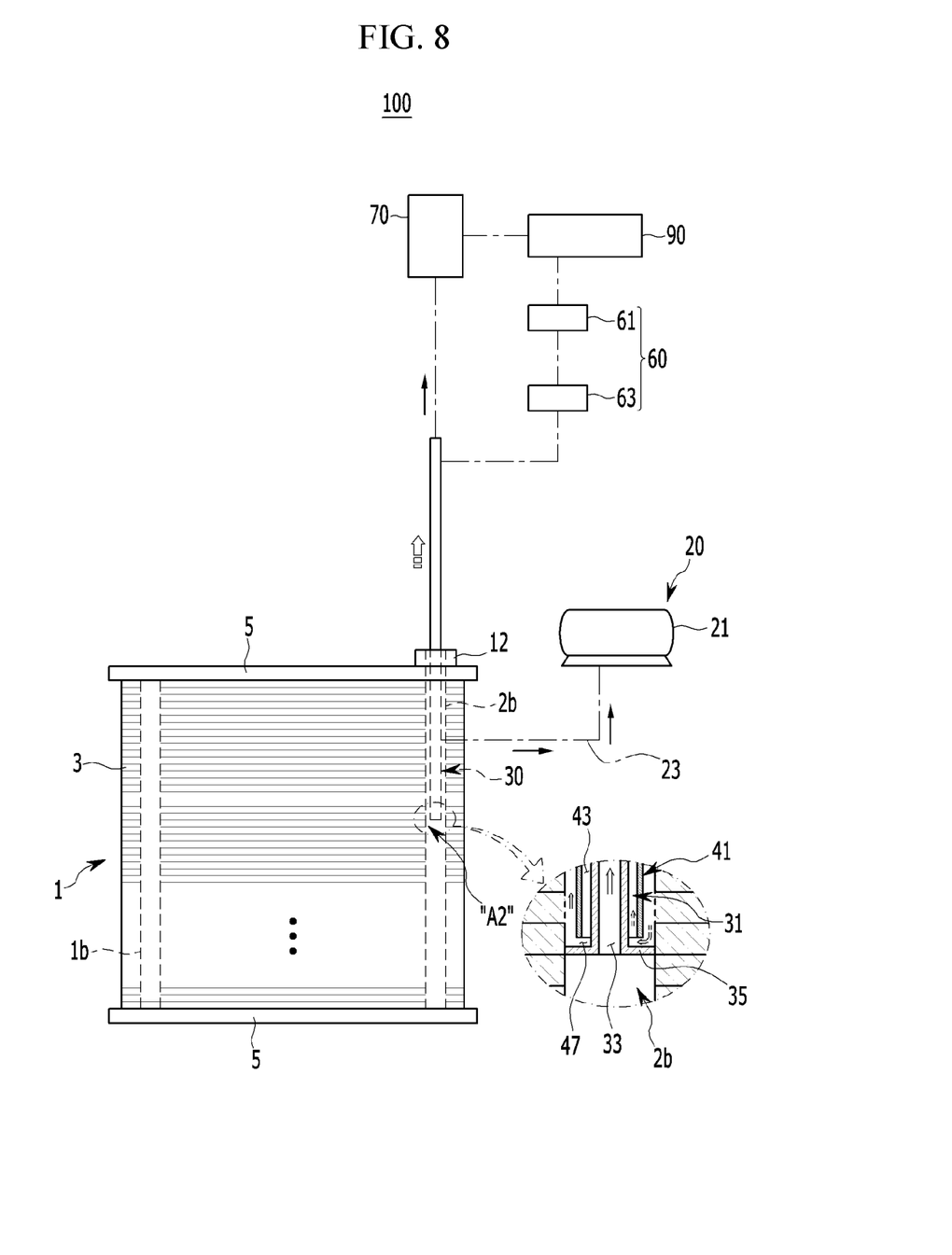

FIG. 5 is a flow chart illustrating a method for testing airtightness of a fuel cell stack according to an exemplary embodiment of the present disclosure, and FIGS. 6 to 8 are views illustrating operational states of a device for testing airtightness of a fuel cell stack to describe a method for testing airtightness of a fuel cell stack according to an exemplary embodiment of the present disclosure.

Referring to FIGS. 5 and 6, first, in an exemplary embodiment of the present disclosure, the first and second jigs 11 and 12 are mounted in the fuel cell stack 1 in operation S11. Here, the first jig 12 closes the first reaction gas inflow portion 1a of the fuel cell stack 1 and opens the second reaction gas inflow portion 2a. Also, the second jig 12 closes the first and second reaction gas outflow portions 1b and 2b of the fuel cell stack 1.

Here, the intake 30 of the second jig 12 is disposed in a vertical stacking direction of the fuel cells 3 in the second reaction gas outflow portion 2b, and the background pipe 31 of the intake 30 is disposed such that a lower end thereof is in contact with the lower end plate 5, as an initial position.

In this state, in an exemplary embodiment of the present disclosure, a control signal is applied to the detection gas supplier 20 through the controller 90, and a detection gas as a helium gas lighter than air is supplied at a set pressure to the first reaction gas inflow portion 1a through the detection gas supplier 20 in operation S12.

Then, the detection gas is introduced to the first reaction gas outflow portion 1b through separators of the fuel cells 3. Here, since the first reaction gas inflow portion 1a is closed through the first jig 11 and the first reaction gas outflow portion 1b is closed through the second jig 12, the detection gas is introduced to the first reaction gas outflow portion 1b through the separators of the fuel cells 3 from the first reaction gas inflow portion 1a to fill the first reaction gas outflow portion 1b at a set pressure.

When it is assumed that an airtightness-defective cell is present among the fuel cells 3 of the fuel cell stack 1, the detection gas introduced to the first reaction gas outflow portion 1b is introduced to the second reaction gas outflow portion 2b through a leak portion of the airtightness-defective cell by the set pressure.

In this state, in an exemplary embodiment of the present disclosure, a control signal is applied to the exhaust pump 50 through the controller 90, and a pumping pressure is provided to the second reaction gas outflow portion 2b through the exhaust pump 50. Here, the exhaust pump 50 applies a pumping pressure to an outer space of the detection pipe 41 and the background source intake passage 33 of the background pipe 31 in the second reaction gas outflow portion 2b.

Then, air is introduced to the second reaction gas outflow portion 2b through the second reaction gas inflow portion 2a and the separators of the fuel cells 3 to the second reaction gas outflow portion 2b by the pumping pressure of the exhaust pump 50.

The air introduced to the second reaction gas outflow portion 2b is outwardly discharged by the pumping pressure of the exhaust pump 50 together with the detection gas introduced to the second reaction gas outflow portion 2b through the leak portion of the airtightness-defective cell.

Thus, in an exemplary embodiment of the present disclosure, the background source (air and the detection gas) of the second reaction gas outflow portion 2b is outwardly discharged by the exhaust pump 50, and a detection background is established in the second reaction gas outflow portion 2b in operation S13.

Here, in the second reaction gas outflow portion 2b, the background source at the outer space of the detection pipe 41 is directly discharged to the outside by the exhaust pump 50, and the other remaining background source is outwardly discharged through the background source intake passage 33 of the background pipe 31 by the exhaust pump 50.

Thereafter, in an exemplary embodiment of the present disclosure, in a state in which the detection background is established in the second reaction gas outflow portion 2b, a control signal is applied to an intake pump (not shown) of the detection gas concentration detector 70 through the controller 90 and a pumping pressure is applied to the detection pipe 41 of the intake 30.

Thus, in an exemplary embodiment of the present disclosure, the background source of the second reaction gas outflow portion 2b is continuously exhausted through the exhaust pump 50, and in a state in which the detection background is established in the second reaction gas outflow portion 2b, the detection source including the air and the detection gas (leak gas) introduced to the second reaction gas outflow portion 2b is intake through the detection pipe 41 and discharged to the detection gas concentration detector 70. The detection gas concentration detector 70 then detects a concentration of the detection gas included in the detection source and outputs the concentration detection value to the controller 90 in operation S14.

At the same time, in an exemplary embodiment of the present disclosure, as illustrated in FIGS. 5 and 7, a control signal is applied to the servo motor 61 of the driver 60 and a rotational force of the servo motor 61 is converted into a linear movement through the guide structure 63 to move the intake 30 in a sequential stacking direction (upward direction) of the fuel cells 3 in operation S15.

Here, the intake 30, supporting an inner wall of the second reaction gas outflow portion 2b through the flange 35 of the background pipe 31, is moved in an upward direction by the driver 60. The detection source of the second reaction gas outflow portion 2b is intaken to the detection source intake passage 43 between an outer circumferential surface of the background pipe 31 and an inner circumferential surface of the detection pipe 41 through the detection source inlet passage 47 between a lower end of the detection pipe 41 and the flange 35 of the background pipe 31, and introduced to the detection gas concentration detector 70 through the detection source intake passage 43.

During this process, in an exemplary embodiment of the present disclosure, cell numbers of the fuel cells 3 are obtained with respect to a movement position of the intake 30 according to a revolution per minute (RPM) of the servo motor 61 in operation S16.

In operation S16, sequential cell numbers of the fuel cells 3 may be obtained through a map based on the RPM of the servo motor 61, a movement position of the intake 30 based on the RPM, the stacking number of the fuel cells 3, and the like.

Meanwhile, for example, when an airtightness defect occurs in a fuel cell 3 in a stacking position indicated by "A1" in FIG. 7, the detection gas introduced from the first reaction gas inflow portion 1a to the first reaction gas outflow portion 1b is introduced to the second reaction gas outflow portion 2b through a leak portion of the airtightness-defective cell A1.

In this case, in an exemplary embodiment of the present disclosure, as stated above, a detection background is established in the second reaction gas outflow portion 2b through the intake 30, a detection source introduced to the second reaction gas outflow portion 2b is intaken through the intake 30, a concentration of the detection gas is detected through the detection gas concentration detector 70, and the detection value is output to the controller 90. Thereafter, in an exemplary embodiment of the present disclosure, the intake 30 is moved in an upward direction by the driver 60.

During this process, the controller 90 obtains cell numbers of the fuel cells 3 with respect to a movement position (lifting position) of the intake 30 based on the RPM of the servo motor 61.

Also, in an exemplary embodiment of the present disclosure, since the detection background is established in the second reaction gas outflow portion 2b, the detected concentration value of the detection gas detected by the detection gas concentration detector 70 is maintained as a uniform concentration value within a set range in a section from a lowermost cell (cell No. 1) of the fuel cells 3 to a previous cell of the stacking position "A1". Thus, the controller 90 sets a section in which the detected concentration value of the detection gas of the detection source is uniform within a set range, to a reference concentration in operation S17.

Thereafter, the intake 30 is lifted, and when the detection source inlet passage 47 of the intake 30 is positioned in the fuel cell 3 at the stacking position "A1", a detection gas leaked from the cell is introduced to the detection source inlet passage 47 together with air, intaken to the detection source intake passage 43, and introduced to the detection gas concentration detector 70 through the detection source intake passage 43. The detection gas concentration detector 70 then detects a concentration of the detection gas and outputs the detection value to the controller 90.

The controller 90 then determines whether the detected concentration value of the detection gas exceeds the reference concentration in operation S18, and when it is determined that the detected concentration value of the detection gas exceeds the reference concentration, the controller 90 indicates the cell number of the fuel cell 3 based on the movement position of the intake 30, and determines the fuel cell corresponding to the cell number, i.e., the cell at the stacking position "A1", as an airtightness-defective cell in operation S19.

In an exemplary embodiment of the present disclosure, the aforementioned process is continuously performed, and here, as illustrated in FIG. 8, an airtightness defect may occur in the fuel cell 3 at the stacking position indicated by "A2", for example.

In this case, since a detection background is established in the second reaction gas outflow portion 2b, a detected concentration value of a detection gas of a detection source detected by the detection gas concentration detector 70 is maintained as a uniform concentration value within a set range in a section from a cell after the stacking position "A1" of the fuel cells 3 to a previous cell of the stacking position "A2".

Here, a detection gas leaked from the airtightness-defective cell in the stacking position "A1" is outwardly discharged through the background pipe 31 of the intake 30. Here, the leaked detection gas is blocked by the flange 35 of the background pipe 31, is not introduced to the detection source inlet passage 47 of the intake 30 from the cells after the stacking position "A1" but outwardly discharged through the background source intake passage 33 of the background pipe 31.

Thereafter, the intake 30 is lifted, and when the detection source inlet passage 47 of the intake 30 is positioned in the fuel cell 3 at the stacking position "A2", a detection gas leaked from the cell is introduced to the detection source inlet passage 47 together with air, intaken to the detection source intake passage 43, and introduced to the detection gas concentration detector 70 through the detection source intake passage 43. The detection gas concentration detector 70 then detects a concentration of the detection gas and outputs the detection value to the controller 90.

Then, when it is determined that the detected concentration value of the detection gas exceeds the reference concentration, the controller 90 indicates the cell number of the fuel cell 3 based on the movement position of the intake 30 and determines the fuel cell corresponding to the cell number, i.e., the cell at the stacking position "A2", as an airtightness-defective cell.

Thus, in an exemplary embodiment of the present disclosure, through the sequential process as described above, an airtightness-defective cell may be accurately located from among the fuel cells 3, without disassembling the fuel cell stack 1. Thus, in an exemplary embodiment of the present invention, a time required for testing airtightness of the fuel cell stack 1 may be shortened and convenience of the testing process may be promoted.

In addition, in an exemplary embodiment of the present disclosure, since the detection source including a minimum amount of detection gas is intaken and a concentration of the detection gas of the detection source is detected in a state in which a detection background is established in the second reaction gas outflow portion 2b through the intake 30, detection accuracy and detection regeneration capability of the detection gas concentration detector 70 may be enhanced and performance of detecting an airtightness-defective cell may be further enhanced.

Hereinabove, exemplary embodiments of the present disclosure have been described in detail with reference to the accompanying drawings. However, the ideas of the present disclosure are not limited thereto and those skilled in the art who understand the ideas of the present disclosure may easily propose any other embodiments within the scope of the present disclosure through addition, change, deletion, and the like, and those embodiments will also be within the scope of the present disclosure.

What is claimed is:

1. A device for testing airtightness of a fuel cell stack including a first reaction gas inflow portion and a first reaction gas outflow portion through which a first reaction gas flows in and out, respectively, and a second reaction gas inflow portion and a second reaction gas outflow portion through which a second reaction gas flows in and out, respectively, the device comprising:
   a detection gas supplier supplying a detection gas to the first reaction gas inflow portion;
   an intake installed to be movable in a sequential stacking direction of fuel cells in the second reaction gas outflow portion;
   a detection gas concentration detector intaking the detection gas through the intake and detecting a concentration of the detection gas; and
   a controller determining an airtightness-defective cell based on a position of the intake by analyzing the detected concentration value of the detection gas detected by the detection gas concentration detector, wherein:
the intake comprises:
a background pipe intaking a background source; and
a detection pipe intaking a detection source, and
the intake is provided as a dual-pipe in which the background pipe is disposed on the inner side of the detection pipe and integrally connected with the detection pipe.

2. The device of claim 1, further comprising:
a jig closing the first reaction gas inflow portion, opening the second reaction gas inflow portion, and closing the first and second reaction gas outflow portions.

3. The device of claim 2, wherein:
the intake intakes air introduced to the second reaction gas outflow portion through the second reaction gas inflow portion and a detection gas leaked to the second reaction gas outflow portion through the first reaction gas outflow portion.

4. The device of claim 3, wherein:
the intake intakes the background source of the second reaction gas outflow portion, establishes a detection background in the second reaction gas outflow portion, and
intakes the detection source of the second reaction gas outflow portion.

5. A device for testing airtightness of a fuel cell stack in which fuel cells are successively stacked, the device comprising:
a first jig closing a first reaction gas inflow portion of the fuel cell stack and opening a second reaction gas inflow portion;
a detection gas supplier connected to the first jig and supplying a detection gas to the first reaction gas inflow portion;
a second jig closing first and second reaction gas outflow portions of the fuel cell stack;
an intake mounted in the second jig and installed to be movable in a sequential stacking direction of the fuel cells within the second reaction gas outflow portion;
a detection gas concentration detector installed to be connected to the intake, intaking a detection source on an inner side of the second reaction gas outflow portion through the intake, and detecting a concentration of the detection gas; and
a controller determining an airtightness-defective cell based on a position of the intake by analyzing the detected concentration value of the detection gas detected by the detection gas concentration detector,
wherein:
the intake comprises:
a background pipe intaking a background source; and
a detection pipe intaking a detection source, and
a detection gas intake passage is provided between an outer circumferential surface of the background pipe and an inner circumferential surface of the detection pipe.

6. The device of claim 5, wherein:
the detection gas supplier comprises:
a gas tank storing a gas lighter than air as the detection gas; and
a supply hose connecting the gas tank and the first reaction gas inflow portion.

7. The device of claim 5, wherein:
the background pipe intakes the background source of the second reaction gas outflow portion; and
the detection pipe is connected to the background pipe provided on an inner side thereof and intakes the detection source of the second reaction gas outflow portion through a portion between the detection pipe and the background pipe.

8. The device of claim 7, wherein:
the second reaction gas outflow portion and the background pipe are connected to an exhaust pump.

9. The device of claim 8, wherein:
the detection pipe is connected to the detection gas concentration detector.

10. The device of claim 5, wherein:
the background pipe has a flange supporting an inner wall of the second reaction gas outflow portion.

11. The device of claim 10, wherein:
the detection pipe is disposed to be spaced apart from the flange, and a detection source inlet passage is provided between the detection pipe and the flange.

12. The device of claim 5, further comprising:
a driver installed in the second jig and linearly moving the intake by a rotational force from a servo motor.

13. A method for testing airtightness of a fuel cell stack, the method comprising steps of:
closing a first reaction gas inflow portion, opening a second reaction inflow portion, closing first and second reaction gas outflow portions, setting an intake in the second reaction gas outflow portion, and supplying a detection gas to the first reaction gas inflow portion;
intaking a background source of the second reaction gas outflow portion through the intake and establishing a detection background;
intaking a detection source of the second reaction gas outflow portion through the intake, and moving the intake in a sequential stacking direction of fuel cells through a servo motor; and
detecting a concentration of the detection gas through a detection gas concentration detector and analyzing the detected concentration value to determine an airtightness-defective cell based on a position of the intake,
wherein:
in the step of setting an intake in the second reaction gas outflow portion,
the intake has a form of a dual-pipe in which a background pipe intaking the background source is provided on an inner side of a detection pipe intaking the detection source.

14. The method of claim 13, wherein:
in the step of intaking a detection source of the second reaction gas outflow portion through the intake, and moving the intake in a sequential stacking direction of fuel cells through a servo motor,
cell numbers of fuel cells are obtained with respect to a movement position of the intake based on a revolution per minute (RPM) of the servo motor.

15. The method of claim 14, wherein:
in the step of detecting a concentration of the detection gas through a detection gas concentration detector and analyzing the detected concentration value to determine an airtightness-defective cell based on a position of the intake,
a section in which the detected concentration value of the detection gas of the detection source detected by the detection gas concentration detector is uniform within a set range is set as a reference concentration, and
it is determined whether the detected concentration value of the detection gas exceeds the reference concentration.

16. The method of claim 15, wherein:

in the step of detecting a concentration of the detection gas through a detection gas concentration detector and analyzing the detected concentration value to determine an airtightness-defective cell based on a position of the intake, when it is determined that the detected concentration value of the detection gas exceeds the reference concentration, the cell number of a fuel cell based on a movement position of the intake is indicated, and the fuel cell corresponding to the cell number is determined as an airtightness-defective cell.

* * * * *